July 18, 1939.  P. R. LUERTZING  2,166,871
METHOD AND APPARATUS FOR MAKING GLASS ARTICLES
Filed Oct. 12, 1937  7 Sheets-Sheet 2

Inventor
Paul R. Luertzing.
By Ross J. Woodward.
Attorney

July 18, 1939.   P. R. LUERTZING   2,166,871
METHOD AND APPARATUS FOR MAKING GLASS ARTICLES
Filed Oct. 12, 1937   7 Sheets-Sheet 5

July 18, 1939.　　　　P. R. LUERTZING　　　　2,166,871
METHOD AND APPARATUS FOR MAKING GLASS ARTICLES
Filed Oct. 12, 1937　　　7 Sheets-Sheet 7

Inventor
PaulR.Luertzing.
By Ross J. Woodward.
Attorney

Patented July 18, 1939

2,166,871

UNITED STATES PATENT OFFICE 2,166,871

METHOD AND APPARATUS FOR MAKING GLASS ARTICLES

Paul R. Luertzing, Vineland, N. J.

Application October 12, 1937, Serial No. 168,664

30 Claims. (Cl. 49—1)

This invention relates to a method and apparatus for making glass articles, and it is one object of the invention to provide an apparatus whereby containers or other articles open at both ends may be formed from glass tubing in a continuous series of automatic operations starting with drawing of a glass tube from the pot of a glass furnace and ending with depositing the finished article upon a conveyor or other place provided for receiving the finished articles.

It is another object of the invention to provide an apparatus including such a construction and arrangement of parts that a glass tube of a predetermined diameter and thickness may be drawn from the glass pot, the tube being then engaged by shapers or moulds where it is accurately gauged and formed with enlargements spaced from each other longitudinally of the tube, after which the tube is engaged by other shapers or carriers and severed between the carriers to provide sections or glass bodies having projecting flared ends which are reheated and acted upon by shapers to impart a desired outline to the flared ends and the finished open ended glass articles then released from the carriers and deposited upon a conveyor for carrying them to a place of disposal.

Another object of the invention is to provide an apparatus of this character wherein the shaping moulds and the carriers for holding the sections of glass tubing are mounted upon endless tracks and moved along the same one after another by endless chains or the like with the shaping moulds and carriers moving in such timed relation to each other that the glass tube can be continuously drawn upwardly from the glass pot and the tube then preshaped by the moulds and engaged by the carriers before being severed to form tubular bodies which are transported by the carriers to reheating means and means for shaping their flared ends. It will thus be seen that glass may be drawn from the glass pot at a steady rate of speed and the various operations carried out by mechanical means and manual labor eliminated.

Another object of the invention is to so form and mount the carriers for the tubular glass bodies that they may be turned after closing about sections of glass tubing which are severed between the carriers and glass bodies carried thereby disposed in proper position for reheating and shaping of the protruding flared ends of the glass bodies.

It is another object of the invention to provide means for imparting rotary motion to the glass holding portions of the carriers during reheating and shaping of the protruding ends of the glass bodies and thus insure proper heating of the protruding ends and also proper shaping of the ends of the glass bodies.

Another object of the invention is to so mount dies for shaping the reheated ends of the glass bodies that they will be accurately moved into and out of position for engaging in the ends of the glass bodies and pressing the same into engagement with shaping rails with which the dies cooperate to impart the desired outline to the flared ends of the glass bodies.

It is another object of the invention to provide improved means for cutting the glass tube into sections, the said means consisting of burners so mounted that they will move into and out of position for directing cutting flames between spaced ends of moving carriers which have engaged about the tube with enlarged portions of the tube exposed between their ends in position to be severed.

Another object of the invention is to provide means for controlling rotation of the article engaging members of the carriers and cause rotation of these members to be brought to a stop in such position that the carriers may be opened and release the finished article.

Another object of the invention is to provide an apparatus of this character wherein all operations take place in proper sequence and the various elements move in proper timed relation to each other and the companion sections or jaws of the shapers and carriers are opened and closed at the proper times.

The invention is illustrated in the accompanying drawings, wherein

Figure 1ª is a sectional view of the glass pot and tube drawing mechanism.

Figure 1:
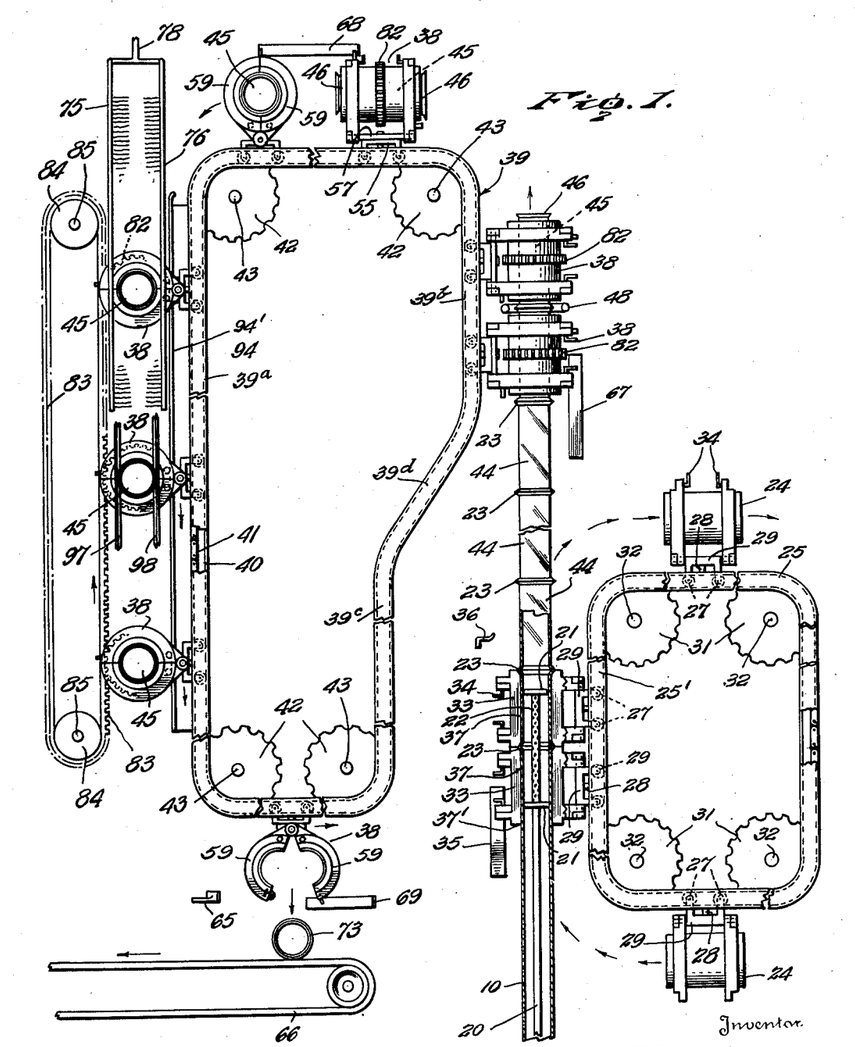
Figure 1 is a diagrammatic view in side elevation of the apparatus, the rear cutters and shaping plugs being omitted for sake of clearness.
Figure 1A:
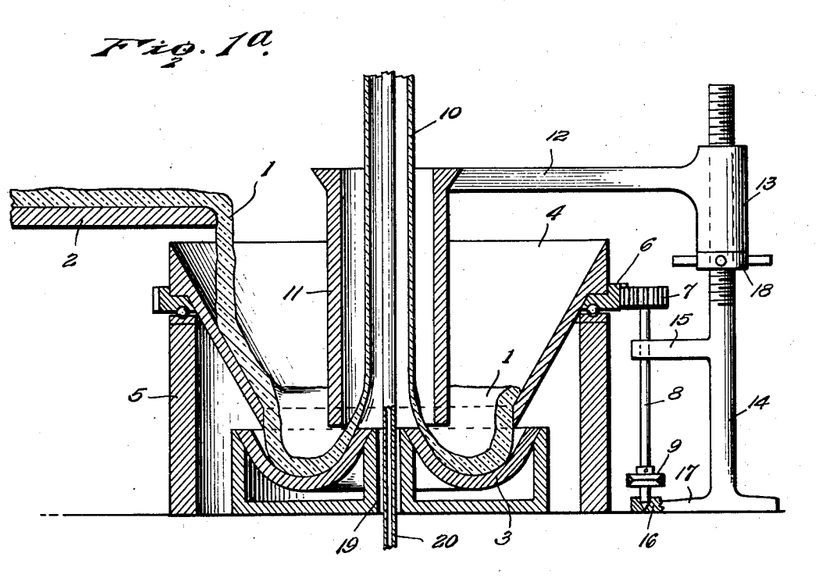

When forming a glass container body or similar open-ended glass article, the first step in accordance with this invention is to draw a glass tube, and referring to Figure 1ᵃ it will be seen that the molten or plastic glass 1 is fed from the glass pot or furnace 2 into the bowl 3, the glass passing from the furnace into the bowl by way of a distributor 4 which is of an inverted frustro-conical formation and rotatably mounted upon a supporting wall 5. A gear or toothed ring 6 surrounds the distributor and is engaged by a small gear or pinion 7 at the upper end of a drive shaft 8 which is rotatably mounted in a vertical position and provided with a pulley or equivalent member 9 by means of which rotary motion may be imparted to this shaft from a suitable source of power. It will thus be seen that rotary motion is continuously imparted to the distributor and the glass will be evenly deposited in the annular bowl or trough. The glass is drawn upwardly from the bowl as a tube 10 and as it moves upwardly the tube passes through a sleeve 11 which is disposed concentric to the bowl and is vertically adjustable so that the distance between the bowl and the lower end of the sleeve may be controlled and the sleeve thus permitted to serve as a gauge for regulating the amount of glass which will be drawn upwardly. Therefore, a tube of approximately predetermined diameter and thickness can be formed. In order to support the sleeve there has been provided an arm 12 which extends radially from the upper end thereof and at its outer end carries an internally threaded sleeve 13 having loose fit about the threaded portion of a post 14. The post is disposed vertically at one side of the wall 5 and distributor 4 and carries a side arm 15 through which the shaft 8 is journaled, the lower end of the shaft being rotatably seated in a bearing 16 formed in the base 17 of the post. A collar or disc 18 which is threaded upon the post under the sleeve 13 serves as a support for the sleeve and by adjusting this collar to raise or lower the sleeve, the sleeve 11 may be shifted vertically and supported in the adjusted position with its lower end a predetermined distance above the substantially conical shaped portion of the bowl. Vertical adjustment of the gauging sleeve will control the space between the bowl and the lower end of the sleeve and limit the amount of glass which can be drawn upwardly through this space to form the tube. Therefore, a tube of the desired size and thickness will be formed. A passage 19 is formed vertically at the center of the bowl and through this opening extends a pipe 20 leading from a suitable source of steam or air under pressure. This pipe extends upwardly quite a distance above the bowl and through the tube axially thereof, as shown in Figure 1, and referring to this figure it will be seen that the upper portion of the pipe carries collars 21 which are disposed at upper and lower ends of a perforated section 22 of the pipe.

Figure 2:
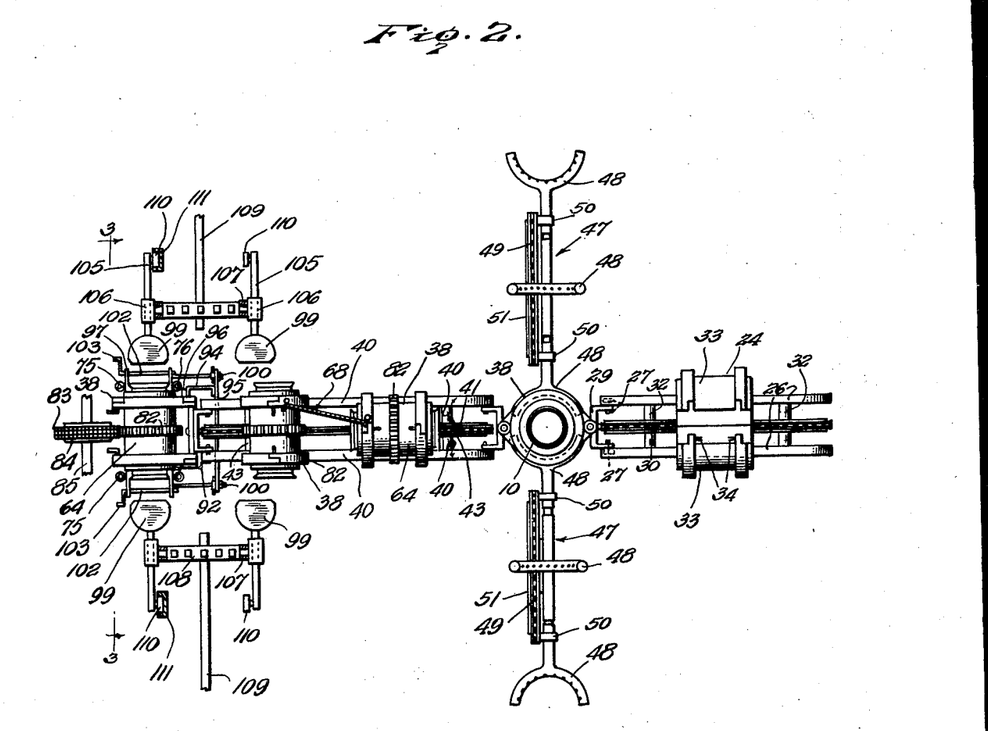
Figure 2 is a top plan view showing the two sets of moulds, the cutting mechanism, and the shaping plugs and means for turning moulds or carriers while shaping ends of the glass articles.

In order that the tube will be of accurate predetermined diameter and formed with circumferentially extending enlargements 23, there have been provided a plurality of moulds 24 which serve not only as means for shaping the tube but also as means for drawing the tube upwardly from the bowl 3 and through the sleeve 11. These moulds 24 travel about an endless track 25 consisting of spaced rails 26 engaged by the rollers 27 of the moulds and stems 28 extend from the carriages 29 of the moulds to connect the carriages with the endless sprocket chain 30 which follows the path of the track between the rails, as shown in Figure 2, and has engagement with sprocket wheels 31 fixed to shafts 32, one of which will constitute a drive shaft and may receive rotary motion from a suitable source. The track may be of any outline desired such as oblong, as shown in Figure 1, but it is important that it have one portion 25' extending in parallel spaced relation to the pipe 20 and the tube 10. The jaws 33 of the moulds are pivoted to the carriages for transverse swinging movement towards and away from each other into and out of a closed position and one jaw of each mould is provided with latches 34 by means of which the jaws may be secured when closed about the tube. The jaws which are normally open are moved to a closed position about the tube as they move upwardly along the vertical section 25' of the track by the closing strips 35 or equivalent cams and when the moulds approach the upper end of this track section, the latches are released by engagement with the releasing cam 36 so that the moulds may open and their jaws swing out of position about the tube. While only a few of the moulds have been shown upon the track it is to be understood that as many as the track will accommodate are to be provided and these moulds located in close proximity to each other as shown upon the portion 25' of the track in Figure 1. When the jaws are closed each mould has a longitudinally extending bore 37 of an even diameter throughout its length except its extreme ends which are flared, as shown at 37'. The moulds successively move into position to close about the tube and as a pair of moulds reach a position disposing their abutting ends substantially midway between the collars 21 of the pipe 20 a blast of steam or air will be discharged from the perforated portion of the pipe and the pressure will serve to force the glass into close contacting engagement with walls of the bores of the moulds, portions of the glass being forced into the flared ends of the bores to form the enlargements 23. Therefore, when the jaws of the moulds are released and move apart to an opened position as the moulds successively move away from the tube and onto the upper portion of the track, the upwardly moving portion of the tube above the track will be formed with a plurality of enlargements spaced from each other even distances. The portions of the tube between the enlargements are all of the same diameter and of an even diameter throughout its length. The tube sections may be circular in transverse cross section or any other outline according to the cross sectional outline of the bores of the moulds. It will thus be seen that a tube of glass may be drawn from a mass of molten glass in the bowl and this tube reshaped before it has hardened to provide sections conforming to the outline of the cross sectional outline of the moulds and separated from each other by circumferentially extending enlargements, these steps all being automatically carried out and the moulds serving to draw the tube upwardly as well as serving to shape the tube.

After the shaped tube is released from the moulds it is engaged by other moulds or carriers 38 which move along an endless track 39. The track 39 is similar in construction to the track 25 and has spaced side rails 40 between which is disposed an endless sprocket chain 41 having engagement with sprocket wheels 42 carried by shafts 43. One of the shafts 43 constitutes a drive shaft and receives rotary motion from a suitable source in any desired manner. The side portion 39$^a$ of the track extends vertically and the other side portion of the track has upper and lower portions 39$^b$ and 39$^c$ connected by a diagonally extending portion 39$^d$, attention being called to the fact that the upper portion extends parallel to the glass tube. By forming the track with the upper and lower portions connected by the diagonally extending portions, the mould or carriers may approach the glass tube as they move upwardly and then engage about the tube and continue their upward movement along the upper portion 39$^b$ which is parallel to the axis of the tube. While only a few of the moulds or carriers have been shown upon the track 39, it is to be understood that as many as it will accommodate are to be in actual use and disposed in such spaced relation to each other that their ends will be in close proximity to but slightly spaced from each other as they move along the section 39$^b$ of the track.

When the moulds or carriers 38 are engaged about the tube, the tube sections 44 defined by the enlargements 23 will project slightly from ends of the carriers and the enlargements will be disposed between the carriers. Therefore, the enlargements may be cut to divide the tube into sections each of which will constitute a tubular blank or glass body 45 having flared ends 46 projecting from opposite ends of the carrier in which it is held. The enlargements are severed by cutters mounted at opposite sides of the tube at right angles to the tracks 25 and 39, this being clearly shown in Figure 2 where the cutters are indicated in general by the numeral 47.

Figures 10, 11:
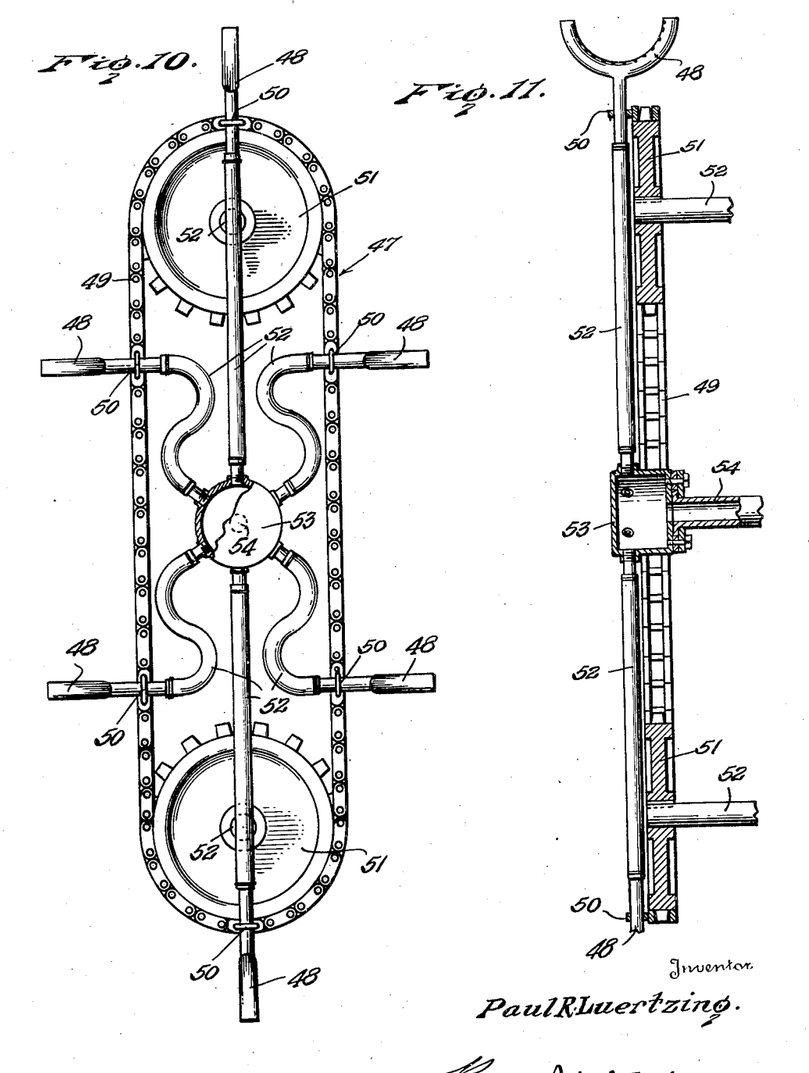
Figure 10 is a side elevation of the cutter mechanism.
Figure 11 is a sectional view taken vertically through Figure 10.

Each of the cutters is constructed as shown in Figures 10 and 11 and referring to these figures it will be seen that each consists of a plurality of burners 48 of semi-circular formation so that companion pairs of burners may engage about the enlargements between spaced ends of the moulds 38, as shown in Figures 1 and 2, and the jets of flame discharged from the small perforations in the burners cut the enlargements and separate the tube into the individual sections or tubular blanks 45. The burners of each cutting mechanism are carried by a sprocket chain 49 where they are secured by clips 50 and project laterally therefrom in such spaced relation to each other longitudinally of the chain that they will be in correct positions to engage between the moulds 38 during upward movement of these moulds or carriers along the portion 39$^b$ of the track 39. The chain engages sprocket wheels 51 carried by shafts 52, one shaft constituting a drive shaft and having rotary motion imparted to it from a suitable source of power. It will be obvious that all of the drive shafts of the various elements of the apparatus must be rotated in such timed relation to each other that the moulds, cutters and other elements to be hereinafter referred to will move in cooperating relation to each other. Flexible pipes 52 lead from the burners or nozzles 48 of each cutter to a drum 53 to which gas is delivered through a pipe 54 and as the drum is permitted to turn during movement of the sprocket chain and the burners, the pipes or tubes 52 will be prevented from becoming wrapped about the drum and tangled with each other.

Figures 5, 6:
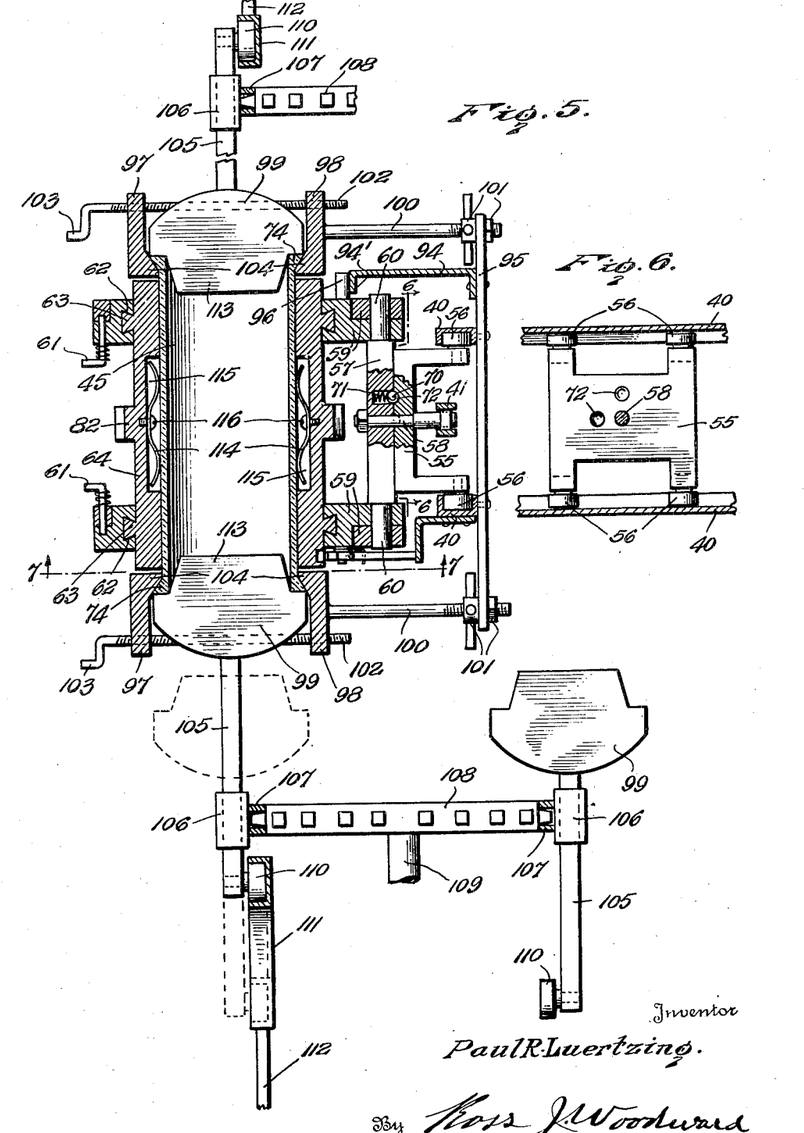
Figure 5 is a sectional view taken transversely through one mould along the line 5—5 of Figure 4.
Figure 6 is a view taken along the line 6—6 of Figure 5 looking at the carriage for the mould.

The moulds or carriers 38 are of duplicate construction and each has a carriage 55 carrying rollers 56 for engaging the rails 40 of the track 39. A platform or cross bar 57 is pivoted to the carriage or truck 55 by a king pin 58 which also constitutes means for connecting the carriage with the sprocket chain 41, as shown in Figure 5. Jaws 59 are pivotally mounted upon the spindles 60 of the cross bar 57 and arranged in pairs, one jaw of each pair being provided with a latch 61 for engaging the companion jaw and releasably holding the mould or carrier closed. Inner surfaces of the jaws are formed with undercut grooves or tracks 62 to receive the dove-tailed ribs 63 extending circumferentially about the longitudinally divided sleeves 64 and mount the sleeve for turning movement in the jaws but prevent the sections of the sleeve from dropping out of place when the jaws are released and move away from each other to open the mould or carrier, as shown at the lower portion of the track in Figure 1. An abutment strip or cam 65 is mounted near the lower portion of the track for engaging and releasing the latches and allowing the jaws to open so that a finished article will be dropped upon the conveyor 66 which carries them to the place where they are to be packed for shipment or stored and other cam strips 67 are provided for closing the moulds as they move upwardly along the side portion 39$^b$ of the track. As the moulds or carriers move upwardly in engagement with the glass tube their sleeves 64 must be disposed longitudinally of the track but during a later portion of the operations which take place during making of the glass containers or similar open-ended articles, the sleeves and the cylindrical blanks carried thereby must be turned to a position transversely of the track. Therefore, there have been provided cam strips 68 and 69, the strip 68 being located over the upper flight of the track and the strip 69 under the lower flight thereof. Engagement of the strip 68 with a carrier will turn the platform or cross bar 57 about the king pin 58 and move the sleeve 64 from a position in which it extends longitudinally of the track to a position transversely thereof and the strip 69 serves to return the sleeve to its initial position. A latching ball 70 which is pressed outwardly by a spring 71 is carried by the cross bar 57 for engagement in the notches 72 formed in the carriage and thus check turning of the cross bar about the king pin and insure stopping of the turning movement when the sleeve is disposed longitudinally of the track or transversely thereof.

Figure 12:
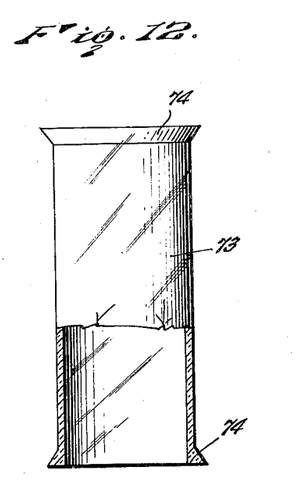
Figure 12 is a view of the finished article shown partially in side elevation and partially in section.
Figure 13:
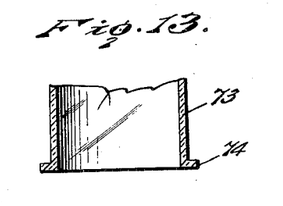
Figure 13 is a fragmentary section showing an article with another form of bead.
Figure 14:
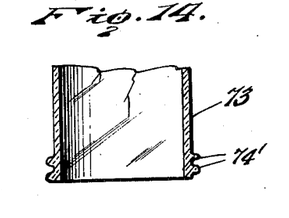
Figure 14 is a sectional view of another form of bead.

After the tube has been cut to form the cylindrical blanks having flared ends which project from opposite ends of the sleeves of the carriers, the flared ends of the blanks are to be shaped to provide the finished container bodies with beads 74 at their ends which may be shaped as shown in Figures 12 and 13 or in the form of double beads or threads, as shown at 74' in Figure 14. It is to be understood that the beads are not limited to the particular forms illustrated in these figures as others may be found desirable. These beads serve as anchoring means for a top and a bottom of a container and while it is intended to make use of metal tops and bottoms for the containers, it is to be understood that they may be formed of any material desired and crimped or screw threaded into engagement with the beads. Therefore, when a glass container formed in accordance with this invention is filled with vegetables, fruit or the like, the contents of the container will be preserved against deterioration but at the same time will be in full view for the entire depth of the container and not only attract the attention of customers when placed upon a store shelf but permit the customer to inspect the same before purchasing.

Figures 7, 8:
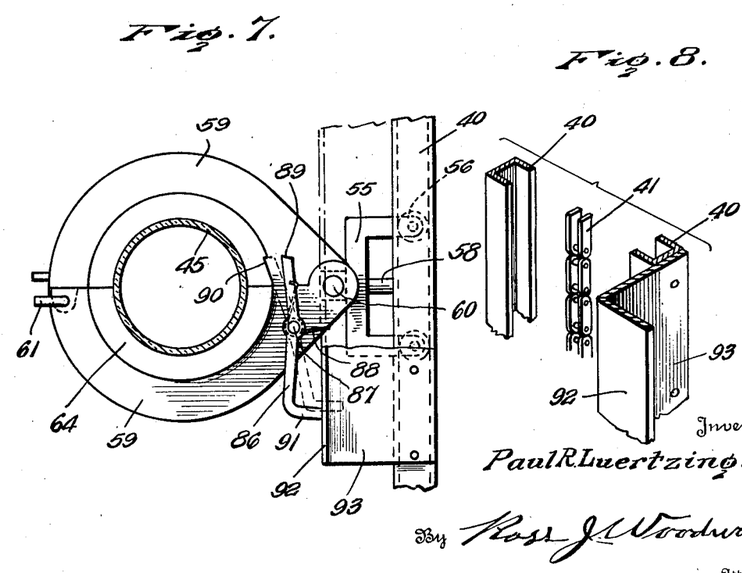
Figure 7 is a view taken along the line 7—7 of Figure 5 and showing the latch which stops turning of the article holding element of the mould when released from the cooperating strip.
Figure 8 is a fragmentary perspective view of the tracks and latch engaging strip of Figure 7.
Figure 9:
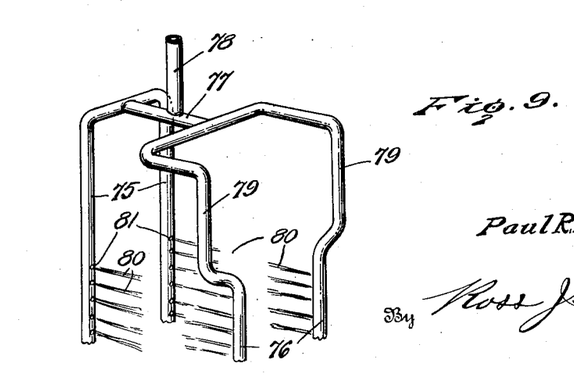
Figure 9 is a perspective view of the upper portion of the heater pipes.

In order that the flared ends of the cylindrical blanks may be shaped to form the beads, they must be reheated sufficiently to soften the glass. In order to do so, there has been provided reheating means consisting of a plurality of pipes 75 and 76 which extend vertically as shown in Figures 1 and 9 and have their upper ends connected with ends of a branch pipe 77 at the lower end of a feed pipe 78 leading from a source of gas. The upper end portions of the pipes 76 are bent away from each other, as shown at 79, in order to provide ample space between these pipes for the carriers 38 to move into place between the pipes and then travel downwardly with the sleeves 64 disposed transversely of the track and the flared ends of the tubular glass blanks moving through the jets of flame 80 discharged towards each other from the perforations 81 of the pipes 75 and 76. The sleeves and the tubular blanks must be rotated during this downward movement so that all portions of the flared ends of the blanks will be evenly heated. In order to do so, each of the sleeves is formed with a circumferentially extending toothed flange or collar constituting a gear 82 which meshes with the teeth of a drive chain 83. This drive chain extends vertically with its upper and lower portions engaged about sprocket wheels 84 carried by shafts 85, one shaft constituting a drive shaft and receiving rotary motion from a suitable source of power in any desired manner. The flight of the chain nearest the track meshes with the teeth of the collars and since the driven sprocket turns in a direction to move this flight upwardly, rotary motion will be imparted to the sleeves of the carriers. In order for the sleeves to open with the jaws of the carriers and drop the finished container upon the conveyor 66, rotation of the sleeves must be brought to a stop in the position shown in Figure 7. Referring to this figure it will be seen that one of the jaws 59 carries a latch 86 which is pivotally mounted, as shown at 87, and engaged by a spring 88 which yieldably holds the latch in position for its toothed end 89 to engage in the notch 90 formed in one section of the divided sleeve. The other end portion or handle of the latch is bent to form a side arm 91 for engaging the flange 92 of a strip 93 extending longitudinally of and secured against a rail 40 of the vertically extending side portion 39ª of the track 39. Therefore, during downward movement of a carrier along the side portion 39ª of the track its latch will be moved to an inoperative position by engagement of the side arm of its handle with the flange of the strip 93 and the sleeve of the carrier will be free to turn. The strip 93 terminates in spaced relation to the lower end of the track and as the latch moves out of engagement with the strip, the spring will return it to the operative position and the sleeve will continue its rotary motion until the tooth of the latch enters the notch 90. The sleeve will thus be brought to a stop with the contacting edge faces of its sections alined with the contacting faces of the jaws 59 and the sleeve sections may move away from each other with the jaws when the carrier is opened by action of the latch releaser 65. The cam strip or bar 69 then turns the carrier about its king pin and the carrier will move upwardly along the section 39ᶜ of the track and along the diagonally extending section 39ᵈ thereof into position to be closed about the tube between the enlargements 23 thereof and move upwardly along the section 39ᵇ of the track to hold and transport the tubular glass blanks as they are cut from the glass tube. During their downward movement along the section 39ª of the track the sleeves and the jaws carrying the same must be prevented from tilting downwardly out of a horizontal position, and in order to do so, there has been provided a metal strip 94 carried by cross bars 95 which are riveted or otherwise secured against the rails 40 of the track. This strip 94 has a flange 94' along its free edge for engagement by pins 96 which project from the jaws of the carriers 38 at one end of each carrier and serve very effectively to limit downward swing of the carriers when they move onto the section 39ª of the track.

After the flared ends of the tubular glass blanks have been reheated they must be shaped to form the containers with end beads 74 of the desired configuration. This is accomplished by means of shaping rails 97 and 98 and shaping blocks or plugs 99. The shaping rails or bars 98 are provided with mounting rods 100 which project therefrom towards the track section 39ª and have threaded end portions passing through openings formed in the cross bars 95 and carrying nuts 101 so that the shaping rails will be firmly supported in a perpendicular position. While only two of the rods 100 have been provided for each of the shaping rails 98 and a corresponding number of cross bars 95, it is to be understood that additional ones may be provided if found necessary or desirable. The shaping rails 97 extend vertically in spaced parallel relation to the shaping rails 98 and are connected with the shaping rails 98 by threaded rods 102 formed with right and left hand threads for engaging through similarly threaded openings formed in the rails 97 and 98 and having turning cranks 103 by means of which they may be easily turned to adjust the shaping rails and dispose them in predetermined spaced and parallel relation to the shaping rails 98. The rails 97 and 98 are disposed in such spaced relation to each other that the protruding ends of the tubular glass blanks 45 will fit snugly between them as the carriers move downwardly, and upon referring to Figure 5 it will be seen that these shaping rails have flanges 104 formed with inner surfaces of the shape which it is desired to impart to the beads 74 of the containers 73.

Figure 3:
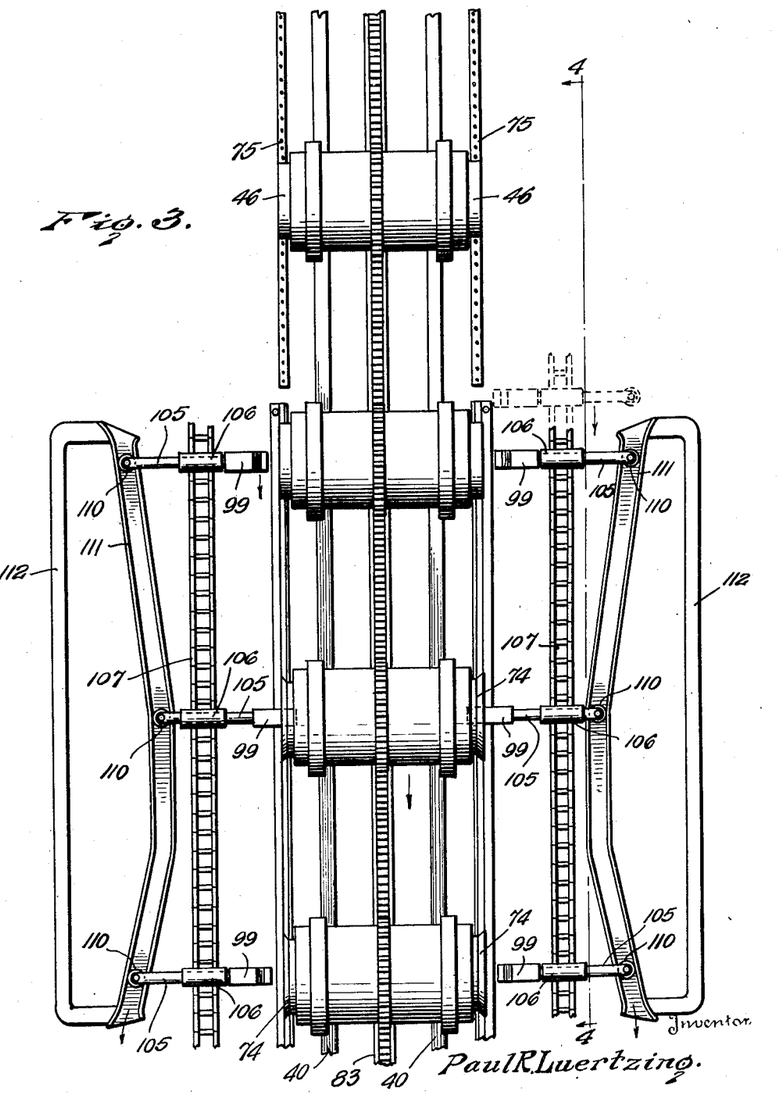
Figure 3 is an enlarged view in elevation taken along the line 3—3 of Figure 2.
Figure 4:
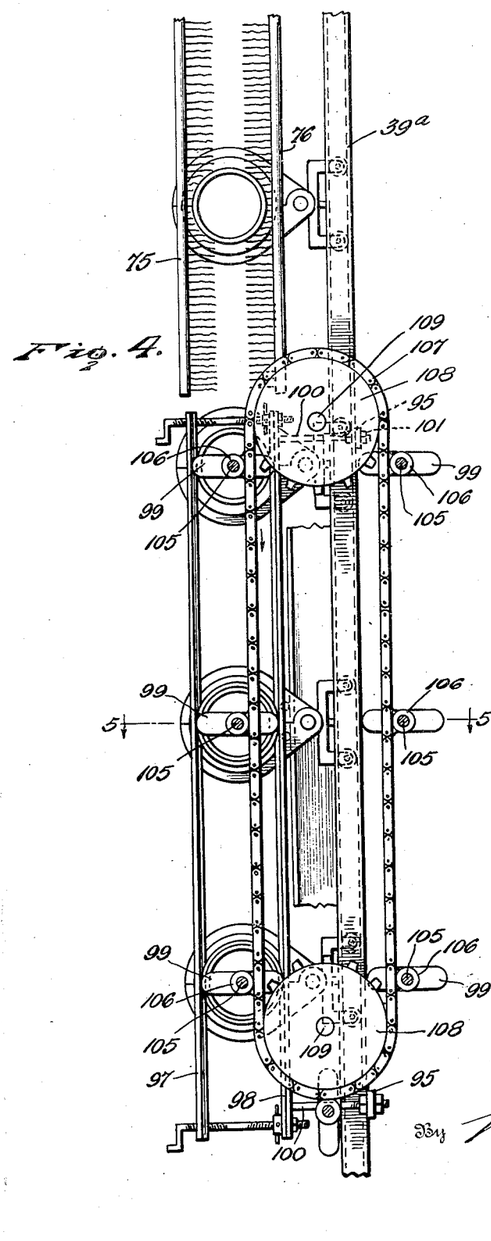
Figure 4 is a view in elevation taken along the line 4—4 of Figure 3.

The blocks or plugs 99 are at the free ends of the rods or shanks 105 which are slidably mounted through sleeves 106 carried by sprocket chains 107. The sprocket chains are engaged with sprocket wheels 108 carried by upper and lower shafts 109 and from an inspection of Figures 2, 3 and 4 it will be seen that as the shafts are rotated and motion imparted to the chains, the plugs will move into position to dispose them at opposite sides of the downwardly moving carriers 38 and in position to enter the flared ends of the tubular glass blanks. Downward movement of the plugs starts at approximately the lower end of the reheating pipes and as they move downwardly, the rollers 110 at the outer ends of the rods or shanks 105 of the plugs will enter upper ends of the guide rails or tracks 111. These tracks or rails are supported vertically by frames 112, and from an inspection of Figure 3 it will be seen that the rails are shaped to provide cams which will move the plugs towards the exposed ends of the glass blanks until they enter the flared ends thereof, then maintain the plugs within the flared ends of the tubular blanks for a short time and then cause the plugs to be withdrawn after a beaded end of the desired configuration has been formed upon each end of the container body. While the plugs enter the flared ends of the tubular glass blanks, as shown in Figure 5, and are shaped to cooperate with the shaping rails to form beads of the desired configuration, it should be noted that these plugs or blocks are in the form of flat plates having tapered portions 113 to permit them to easily enter the flared ends of the glass blanks. The tubular glass blanks turn with the sleeves 64 of the carriers and thus have movement relative to the shaping rails and the plugs or blocks and the flared ends 46 of the glass blanks will be acted upon in such a manner that the beads will be quickly formed. The fact that blocks or thick plates are used as shaping plugs prevents ends of the glass blanks being tightly closed during formation of the beads and insertion and removal of the blocks will thus be very easy. The tubular glass blanks must be prevented from failing to turn with the sleeves 64 and there has, therefore, been provided spring clips 114 which extend longitudinally of the sleeves in recesses or pockets 115 formed therein, as shown in Figure 5, where they are secured by screws 116. These springs are formed with curved end portions so that they may have a good yielding grip upon the tubular glass blanks and frictionally hold the blanks against movement independent of the sleeves.

When this apparatus is in use, glass is fed into the bowl 3 and evenly distributed therein by turning of the mouth or distributor 4. The glass is drawn upwardly from the bowl through the gauging sleeve 11 by pull exerted by the moulds 24 which successively move into position to engage about the upwardly moving tube. The steam or compressed air discharged from the perforated portion of the pipe 20 between the collars 21 expands the hot glass and causes formation of sections 44 which are of an even diameter and thickness and set off from each other by the enlargements 23. These sections are engaged by the sleeves of the carriers 38 after the moulds 24 have opened and moved out of engagement with the glass tube and as the tube continues its upward movement the cutting burners move into position to sever the glass tube at the enlargements 23 and form the tubular glass blanks 45, each of which is carried by the sleeve of a carrier. These carriers move across the upper portion of the track 39 and during this movement, the sleeves and the jaws of the carriers are turned about the king pins by action of the cam strip 68 to a position in which the sleeves are disposed transversely of the track instead of longitudinally thereof. The carriers upon reaching the end of the upper portion of the track will move downwardly along the portion 39ᵃ thereof and the sleeves will enter the reheater formed by the pipes 75 and 76 and the protruding flared ends of the tubular glass blanks will be heated sufficiently to permit the glass to be worked. Upon the carriers leaving the reheater, the flared ends of the glass blanks will engage the shaping flanges of the shaping rails and the plugs or blocks will move into position to enter the flared ends and cooperate with the shaping rails to form beads of the desired configuration as the carriers continue their downward movement and their sleeves are rotated by the chain 83. The latches 86 which have been held in an inoperative position during rotation of the sleeves move into position to engage in the notches 87 when they leave the restraining strip 93 and cause the sleeves to be brought to a stop in such position that the sections of the sleeves can move away from each other as the latches 61 of the sleeves are released. Therefore, the carriers may open and allow the finished containers to drop upon the conveyor 66 which will carry them to the place where they are to be packed or stored for future use. The cam strip 69 can then act upon the open carriers to turn their sleeves about the king pins and restore them to a position in which they again extend longitudinally of the track and can be moved to a closed position about the sections 44 of the glass tube 10 by action of the cam strips 67. It will thus be seen that a continuous series of steps take place from the time the glass tube 10 is drawn from the bowl 3 until the finished containers are discharged from the carriers 38 onto the conveyor 66. It will also be noted that all of the steps are entirely automatic and take place in proper timed relation to each other and that manual attention or labor is eliminated.

Having thus described the invention, what is claimed as new is:

1. The method of forming open ended glass bodies comprising drawing a glass tube, shaping the tube while in motion to form outstanding annular enlargements spaced from each other longitudinally of the tube, engaging portions of the tube between the enlargements by moving carriers, cutting the tube at the enlargements to form tubular blanks each carried by a carrier and having flared ends projecting therefrom, reheating the flared ends while the carriers are in motion, and shaping the reheated ends to form outstanding circumferentially extending beads.

2. The method of forming open ended glass bodies by a continuous series of operations comprising drawing a glass tube, shaping the tube while drawing the same to form the moving tube with outstanding annular enlargements and shaped portions between the enlargements, engaging the shaped portions with moving carriers of a length disposing each enlargement between adjoining ends of a pair of carriers, cutting the exposed enlargements to form tubular bodies having flared ends projecting from the carriers, reheating the projecting flared ends while the carriers are in motion, shaping the reheated flared ends to form outstanding beads of predetermined shape while the carriers are in motion, and releasing the glass bodies from the moving carriers.

3. The method of forming open ended glass bodies comprising drawing a glass tube, shaping the moving tube to provide tubular sections set off from each other by outstanding annular projections, engaging the sections between the projections by moving carriers, cutting the tube at the projections to form tubular blanks each held in a moving carrier and having flared ends projecting from the carrier, reheating the flared ends and shaping the same while the carriers are in motion to form beads about ends of open ended glass bodies, and automatically releasing the glass bodies from the moving carriers.

4. The method of forming open ended glass bodies comprising drawing glass to form a glass tube and shaping the moving tube to form sections set off from each other, engaging the sections by carriers moving towards a reheating station and returning into position to engage tube sections, cutting the moving tube between the carriers to provide tubular glass bodies each having ends projecting from opposite ends of a carrier, reheating the projecting ends of the glass bodies and shaping the same while the carriers are in motion to form beads about ends of the bodies, and releasing the glass bodies from the moving carriers.

5. The method of forming open ended glass bodies by a continuous series of operations comprising drawing a tube of glass of approximately a predetermined diameter and shaping the moving tube to form cylindrical sections set off from each other by outstanding circumferential projections, engaging continuously moving carriers about said sections in spaced relation to the projections, cutting the enlargements while the carriers and the tube are in motion to form open ended glass bodies each having flared ends projecting from opposite ends of a carrier, directing the carriers through a heating zone to reheat the flared ends of the glass bodies, moving shapers into and out of engagement with the reheated ends of the glass bodies to form beads of the flared ends while the carriers are in motion, and releasing the shaped bodies from the moving carriers.

6. The method of forming open ended glass bodies having beaded ends by a continuous series of operations comprising drawing a glass tube from a source of melted glass through the medium of continuously moving shapers, expanding portions of the tube engaged in the shapers to form cylindrical tubular sections set off from each other by outstanding annular enlargements, successively moving the shapers out of engagement with the shaped portions of the tube, successively directing continuously moving carriers into gripping engagement with the shaped sections with each enlargement disposed between spaced ends of a pair of carriers, moving gas flames into and out of position to cut the enlargements and divide the tube into tubular glass bodies each carried by a carrier and having flared ends projecting from opposite ends of the carrier, directing the carriers successively through a heating zone to reheat the flared ends of the glass bodies and then moving the reheated ends along stationary shaping members, imparting rotary motion to the carriers to rotate the glass bodies while moving through the heating zone and along the stationary shaping members, successively moving cooperating shapers into and out of position to engage in ends of the rotating glass bodies and cooperate with the shaping members to form the flared ends into beads about ends of the bodies, and releasing the glass bodies from the moving carriers.

7. In an apparatus for making open ended glass articles, means for drawing a glass tube, means for forming enlargements about the tube in spaced relation to each other longitudinally thereof, means for severing the tube at the enlargements to divide the tube into tubular glass bodies having flared ends, means for transporting the glass bodies, means for reheating the flared ends of the glass bodies, means for reshaping the flared ends of the glass bodies, and means for releasing the glass bodies from the transporting means after the reheating and reshaping of their flared ends.

8. In an apparatus for making open ended glass articles, shapers for drawing a glass tube mounted for continuous movement into position to successively grasp the tube and then successively release the tube as the tube is drawn, carriers successively moving into position for engaging about sections of the moving tube, means for severing the tube between the carriers and dividing the tube into tubular bodies each held by a moving carrier with its ends projecting from the carrier, means for reheating the ends of the glass bodies, means for forming the reheated ends of the glass bodies into circumferentially extending beads, and means for releasing the beaded glass bodies from said carriers.

9. Apparatus for forming open ended glass articles comprising means for drawing a glass tube and shaping the tube to form sections set off from each other by annular external enlargements, carriers for engaging about the tube sections between the enlargements, means for cutting the enlargements and dividing the tube into tubular glass bodies each carried by a carrier and having flared ends protruding from opposite ends thereof, means for reheating the flared ends of the glass bodies, means for shaping the reheated flared ends of the glass bodies to form beads of predetermined shape, and means for releasing the beaded glass bodies from the carriers.

10. Apparatus for forming open ended glass articles comprising means for drawing a glass tube and shaping the tube to form sections set off from each other by annular external enlargements, carriers for engaging about the tube sections between the enlargements, means for cutting the enlargements and dividing the tube into tubular glass bodies each carried by a carrier and having flared ends protruding from opposite ends thereof, a reheating zone, elongated stationary shapers extending from the reheating zone, the carriers being directed along a path parallel to the stationary shapers for movement of the flared ends of the glass bodies through the reheating zone and along the stationary shapers in contact therewith, means for rotating said carriers during movement thereof along the said path, shapers movable into and out of position to engage in the flared ends of the glass bodies and cooperate with the stationary shapers to form the flared ends into beads of predetermined shape extending circumferentially of the glass bodies, and means for releasing the beaded glass bodies from said carriers.

11. Apparatus for making open ended glass articles comprising a plurality of shapers for drawing a glass tube, said shapers being mounted for movement one after another into and out of position to engage about portions of the tube, means for expanding portions of the tube engaged by said shapers and forming the tube into sections conforming to the interior configuration of the shapers and set off from each other by external annular enlargements, carriers for engaging about the tube sections between the enlargements, means for cutting the enlargements and dividing the tube into tubular bodies each carried by a carrier and having flared ends projecting from opposite ends thereof, means for reheating the flared ends of the glass bodies, means for reshaping the reheated flared ends and forming beads about ends of the glass bodies, means for rotating the carriers during reheating and reshaping of the flared ends of the glass bodies, and means for releasing the glass bodies from the carriers after reshaping of their ends.

12. Apparatus for forming open ended glass articles comprising movably mounted shapers for engaging about and drawing a glass tube, means for forming the tube with annular enlargements while engaged by the shapers, means for successively releasing the shapers from the tube, carriers moving in a path having a portion extending parallel to the tube and then away from the tube, means for engaging the carriers about the tube between the enlargements with each enlargement located between spaced ends of a pair of carriers, means for cutting the enlargements and dividing the tube into tubular glass bodies each carried by a carrier and having flared ends projecting from opposite ends of the carrier, means for reheating the flared ends of the glass bodies while the carriers are in motion, stationary shapers disposed in position for engagement by the reheated ends of the glass bodies, means for rotating said carriers, companion shapers movable into and out of position to engage in the flared ends of the reheated glass bodies and cooperate with the stationary shapers to form the flared ends into beads of predetermined shape extending circumferentially about the glass bodies, and means for releasing the beaded glass bodies from the carriers.

13. In an apparatus for making open ended glass articles, a plurality of shapers mounted for movement one after another into and out of position to engage about and draw a glass tube from a supply of molten glass, means for expanding portions of the tube within the shapers to form tube sections set off from each other by circumferentially extending enlargements, carriers each having a carriage and jaws for engaging about a tube section between enlargements, a track for said carriages having a portion extending parallel to said tube, means for moving the jaws of the shapers into engagement about the tube sections as the carriages move along the said portion of the track, means for cutting the tube about the enlargements to divide the tube into tubular bodies each having flared ends projecting from opposite ends of jaws gripping the same, a reheater having pipes extending parallel to another portion of said track and having outlets for directing jets of flame towards each other, stationary shaping rails extending from said reheater longitudinally of the last mentioned track portion, said jaws being pivoted to the carriages for turning adjustment from a position longitudinally of the track to a position transversely thereof, means for turning the jaws to the transverse position and disposing the flared ends of the glass bodies in position to pass through the flames of the reheater and then move along the shaping rails, companion shapers movable into and out of position to engage in the flared ends of the glass bodies during movement thereof along the shaping rails and together with the rails forming beads of the flared ends, means for rotating said jaws and the glass bodies during the reheating and reshaping of the flared ends, means for releasing the jaws and permitting movement thereof out of engagement about the glass bodies, and means for returning the jaws to a position longitudinally of the track.

14. In an apparatus for making open ended glass articles, a source of molten glass, an annular bowl, an annular distributor for receiving molten glass from the source rotatably mounted over the bowl for evenly distributing the glass in the bowl, a sleeve disposed centrally over the bowl and vertically adjustable to vary distance between the bowl and the lower end of the sleeve and provide an annular entrance at the lower end of the sleeve of adjusted dimensions, shapers movable into and out of position over the sleeve to engage about a glass tube and draw the glass upwardly from the bowl through the sleeve as a tube of approximately a predetermined diameter, means cooperating with the shapers for expanding the tube therein and forming tube sections of predetermined outline, carriers for engaging about the said tube sections, means for operating between the carriers and severing the tube sections from each other to form tubular glass bodies each carried by a carrier, means for reheating ends of the glass bodies while the carriers are in motion, means for shaping the reheated ends of the glass bodies while the carriers are in motion and forming the glass bodies with circumferentially extending beads, and means for releasing the beaded glass bodies from said carriers.

15. In an apparatus for making open-ended glass articles, a source of molten glass, an annular bowl having a frustro-conical central portion, an inverted frustro-conical distributor rotatably mounted over said bowl for receiving molten glass from the source and evenly distributing the glass in the bowl, a sleeve disposed vertically over the central portion of said bowl concentric thereto, means for vertically adjusting the sleeve and supporting the sleeve in an adjusted position with its lower end spaced upwardly from the central portion of the bowl a predetermined distance and form an annular entrance at the lower end of the sleeve, means operating over the sleeve for engaging a tube and drawing glass upwardly from the bowl through the entrance and upwardly through the sleeve as a glass tube, moving carriers for engaging said tube above the drawing means, means for severing the tube between said carriers and dividing the tube into tubular glass bodies each carried by a carrier, means for reheating ends of said glass bodies, means for shaping the reheated ends of the glass bodies and forming beaded ends for the glass bodies, and means for releasing the beaded glass bodies from said carriers.

16. In an apparatus for making open ended glass articles, a source of molten glass, an annular bowl having a frustro-conical central portion, an inverted frustro-conical distributor rotatably mounted over said bowl for receiving molten glass from the source and evenly distributing the glass in the bowl, a sleeve disposed vertically over the central portion of said bowl concentric thereto, means for vertically adjusting the sleeve and supporting the sleeve in an adjusted position with its lower end spaced upwardly from the central portion of the bowl a predetermined distance and form an annular entrance at the lower end of the sleeve, and means for drawing glass upwardly from the bowl through the entrance and upwardly through the sleeve in the form of a glass tube of predetermined diameter and thickness.

17. In an apparatus for making open ended glass articles, means for drawing a glass tube, carriers movable successively into position to engage about portions of the glass tube with ends of the carriers spaced from each other, endless flexible members having flights moving parallel to the tube at opposite sides of carriers engaging the tube, a gas drum associated with each endless member, flexible pipes leading from said drum, forked nozzles connected with said pipes and secured to said flexible members and projecting therefrom in position to engage about portions of the tube from opposite sides thereof between the carriers and direct jets of flame against the tube to sever the tube and divide the same into tubular glass bodies each held by a carrier with its ends protruding from opposite ends of the carrier, means for reheating the ends of the glass bodies while the carriers are in motion, means for shaping the reheated ends of the glass bodies while the carriers are in motion and forming circumferentially extending beads at ends of the glass bodies, and means for releasing the beaded glass bodies from said carriers.

18. In an apparatus for making open ended glass articles, means for drawing a glass tube and shaping the tube to provide sections set off from each other, carriers movable successively into position to engage about the tube sections and grip the same, means for severing the tube sections from each other and forming tubular glass bodies each carried by a carrier with its ends exposed at opposite ends of the carrier, means for reheating exposed ends of said glass bodies while the carriers are in motion, pairs of shaping rails extending from said reheating means at opposite sides thereof, the rails of each pair being disposed in position for engaging opposite side portions of an exposed end of a glass body, movable shapers, means for guiding the movable shapers into and out of position to engage in ends of the glass bodies and together with the shaping rails form the reheated ends of the glass bodies into beads extending circumferentially thereof, means for rotating said carriers, and means for releasing the beaded glass bodies from said carriers.

19. The structure of claim 18 wherein one rail of each pair of shaping rails is adjustably carried by a support for adjustment diametrically of exposed ends of the glass bodies and the other rail is adjustably connected with the first rail for adjustment diametrically of the exposed ends of the glass bodies.

20. In an apparatus for making open ended glass articles, means for drawing a glass tube, carriers successively movable into position to engage about portions of said tube with ends of the carriers spaced from each other, means for severing the tube between the carriers and dividing the tube into tubular glass bodies each carried by a carrier with its ends exposed, means for reheating exposed ends of said glass bodies, shaping rails extending from a point adjacent said reheating means, endless flexible members movably mounted in position for passage of the carriers between the endless flexible members, movable shapers shiftably carried by said flexible members, means for shifting the movable shapers into and out of position to engage in the exposed ends of the glass bodies during movement of the flexible members and to cooperate with the shaping rails to form circumferentially extending beads of the reheated ends of the glass bodies, and means for releasing the beaded bodies from said carriers.

21. In an apparatus for making open ended glass articles, means for drawing a glass tube, carriers successively movable into position to engage about portions of said tube with ends of the carriers spaced from each other, means for severing the tube between the carriers and dividing the tube into tubular glass bodies each carried by a carrier with its ends exposed, means for reheating exposed ends of said glass bodies, shaping rails extending from a point adjacent said reheating means, endless flexible members movably mounted in position for passage of the carriers between the endless flexible members, sleeves carried by said flexible members, movable shapers having shanks slidably engaged through said sleeves, tracks engaged by the shanks and serving to slide the shanks through the sleeves and successively move the movable shapers into and out of position to engage in the exposed ends of the glass bodies during movement of the flexible members and to cooperate with the shaping rails to form circumferentially extending beads of the reheated ends of the glass bodies, and means for releasing the beaded bodies from said carriers.

22. In an apparatus for making open-ended glass articles, means for drawing a glass tube, reheating means, elongated stationary shapers extending from a point adjacent said reheating means, an endless track having a portion extending longitudinally of a glass tube drawn by the tube drawing means and another portion extending longitudinally of the heating means and the stationary shapers, a plurality of carriers spaced from each other along the track and each comprising a truck engaging the track, a mounting member swiveled to said truck for turning adjustment, jaws pivoted to said mounting, means to releasably hold the jaws closed, a sleeve rotatably mounted between the jaws and split longitudinally to provide sections adapted to open and close with the jaws, means to close the jaws and sleeve sections about sections of the glass tube as the carriages move along the section parallel to the tube, means to cut the tube between the sleeves and divide the tube into tubular glass bodies each carried in a sleeve, means for turning the sleeves and jaws together with the mountings from a position longitudinally of the track to a position transversely thereof as the carriages approach the track section extending longitudinally of the reheater and the stationary shapers whereby ends of the glass bodies will be reheated by passage through the reheating means and then engage the stationary shapers, movable shapers movable into and out of position to engage in the reheated ends of the glass bodies and to cooperate with the stationary shapers to form ends of the glass bodies into beads extending circumferentially of the glass bodies, means for releasing the jaws to permit opening of the jaws and sleeve sections for discharge of the beaded glass bodies, and means for returning the jaws and sleeves together with their mountings to a position longitudinally of the track as they approach the tube.

23. The structure of claim 22 wherein each sleeve is provided with a circumferentially extending gear, an endless gear chain extending longitudinally of the reheater and the stationary shapers and meshing with the gears of the sleeves for rotating the sleeves during the reheating and shaping of ends of the glass bodies, latches for engaging the sleeves and stopping rotation thereof in position to open with the jaws after the carriages move away from the stationary shapers, and means for holding the latches in an inoperative position during turning of the sleeves.

24. The method of forming open ended glass articles comprising continuously drawing glass to form a longitudinally moving glass tube, engaging the moving tube by moving carriers, dividing the tube between the moving carriers to form tubular glass bodies open at both ends, reheating ends of the bodies and shaping same during progress of the carriers to form heads about their open ends, and releasing the glass bodies from the carriers.

25. The method of forming open ended glass articles comprising continuously drawing a glass tube, shaping the tube while in motion, engaging the moving tube with moving carriers, dividing the tube between the carriers to form glass bodies open at both ends, reheating ends of the bodies while the carriers are in motion, shaping the reheated ends of the bodies while the carriers are in motion to form beads about the open ends of the bodies, and releasing the bodies from the carriers.

26. The method of forming open ended glass articles by a continuous series of operations comprising continuously drawing glass from a source of supply to form a moving column of glass tubing, shaping the glass tubing while in motion, engaging the moving tubing with moving carriers, dividing the tubing to form open ended tubular glass bodies, subsequently heating ends of the glass bodies, shaping the heated ends of the bodies while in motion to form beads about the same, and releasing the bodies from the carriers.

27. The method of forming open ended glass articles comprising continuously drawing glass from a source of supply and forming a tube of molten glass, engaging the tube by movable carriers, shaping the hot moving tube to form shaped sections engaged by the carriers, dividing the tube between the carriers to form open ended shaped tubular bodies carried by the carriers and having end portions projecting therefrom, reheating the projecting portions of the bodies during progress of the carriers, reshaping the reheated portions of the bodies during progress of the carriers to form beads about the open ends of the bodies, and releasing the reshaped bodies from the carriers.

28. In an apparatus for making open ended glass articles, means for forming a glass tube, means for severing the tube to form tubular glass bodies, means for transporting the glass bodies, means for heating end portions of the glass bodies, and means for shaping the heated end portions of the glass bodies while being transported.

29. In an apparatus for making open ended glass articles, shapers for drawing a glass tube, carriers for engaging about sections of the moving tube, means for severing the tube between the carriers to form tubular bodies carried by said carriers, means for reheating ends of the glass bodies, means for shaping the reheated ends of the glass bodies into predetermined shapes, and means for releasing the glass bodies from said carriers.

30. In an apparatus for making open ended glass articles, means for drawing glass to form a glass tube, means for severing the tube to form tubular glass bodies, means for transporting said glass bodies, means for reheating portions of the glass bodies while being transported, and means for shaping the reheated portions of the glass bodies before delivery thereof from said transporting means.

PAUL R. LUERTZING.